Nov. 14, 1939.    J. W. LEIGHTON    2,179,856
THREADED BEARING AND METHOD OF MAKING THE SAME
Original Filed March 20, 1936    2 Sheets-Sheet 1
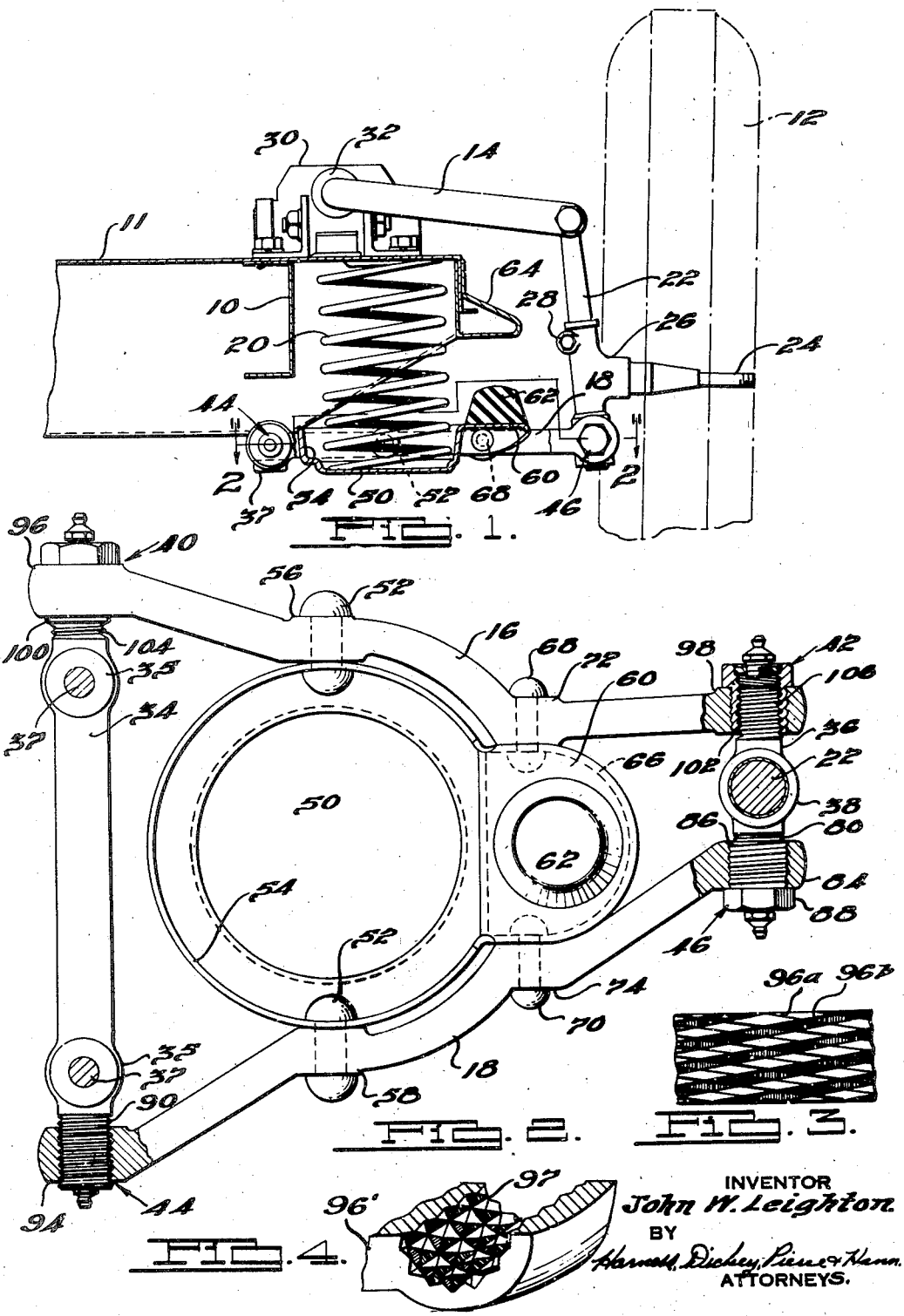
INVENTOR
John W. Leighton
BY
Harness, Dickey, Pierce & Henn
ATTORNEYS.

Nov. 14, 1939.  J. W. LEIGHTON  2,179,856
THREADED BEARING AND METHOD OF MAKING THE SAME
Original Filed March 20, 1936  2 Sheets-Sheet 2
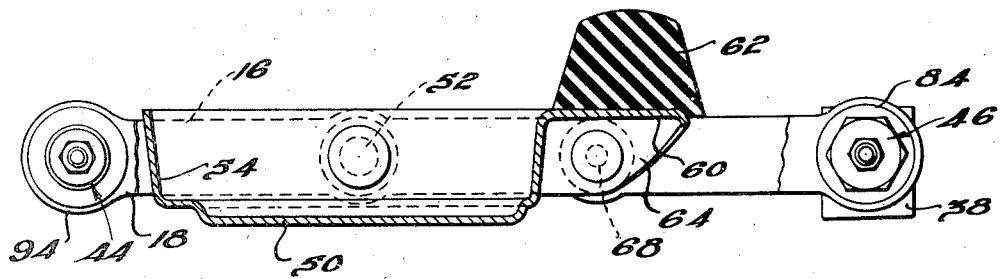
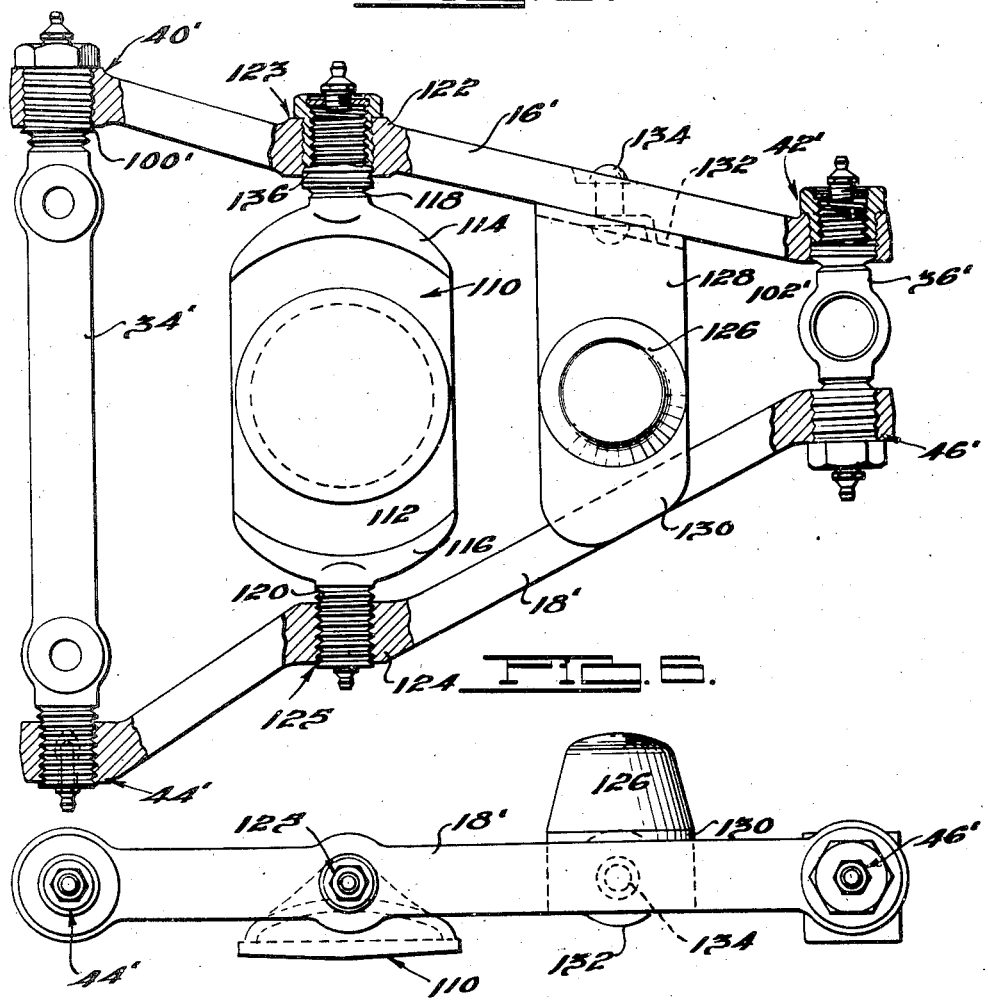
INVENTOR
John W. Leighton
BY
Harness, Dickey, Pierce & Henn
ATTORNEYS.

Patented Nov. 14, 1939

2,179,856

UNITED STATES PATENT OFFICE 2,179,856

THREADED BEARING AND METHOD OF MAKING THE SAME

John W. Leighton, Port Huron, Mich.

Application March 20, 1936, Serial No. 69,785
Renewed April 3, 1939

21 Claims. (Cl. 29—149.5)

The present invention relates to threaded bearings and methods of making the same and particularly provides an improved wheel suspension of the individually sprung type embodying improved threaded bearings, and also provides an improved method for assembling such a suspension.

Objects of the present invention are to provide an improved individual wheel suspension embodying a plurality of pivotally mounted wishbone arms, so constructed as to insure proper positioning of the arms relative to each other and relative to the pivotal mountings therefor; to provide such a construction in which the pivotal mountings are of the threaded bearing type, so constructed that the assembling of the suspension may be effected economically and rapidly, while insuring proper positioning of the arms relative to each other and relative to the pivotal mountings therefor; and to provide a method of rapidly, economically and accurately assembling the elements of a wheel suspension embodying bearings of the threaded type.

Further objects of the present invention are to provide, in a wheel suspension or the like, a threaded bearing embodying a bolt, a boss for receiving the bolt, and a bushing interposed between the bolt and boss, the members being so constructed that in assembling them, certain thereof form threads in others thereof; to provide such a construction in which the bolt is externally threaded and the boss is internally threaded, and the bushing is adapted to be simultaneously threaded onto said bolt and into said boss, the parts being so constructed that in said threading operation, the bushing forms threads in the bolt or the boss; to provide such a construction in which, in order to facilitate the forming of the threads, part of the metal from the member to be threaded by the bushing is preliminarily cut away to form a plurality of grooves or the like therein, which constitute lubricant wells, and also receive the metal which is displaced during the threading operation; and to provide such construction in which the member to be threaded is provided with oppositely directed threads, or is broached to form a plurality of axially extending serrations or the like to form the just mentioned grooves.

Further objects of the present invention are to provide a method for assembling the elements of a wheel suspension, which suspension may include an arm having a pivotal threaded bearing connection at each end with associated members, which method may include assembling the arm to the associated supporting member by means of a threaded bushing, the bushing acting to form threads in either the arm or the cooperating member during the assembly, to thereby insure proper positioning of the arm relative to the associated bearing members.

Further objects of the present invention are to provide an improved individual wheel suspension embodying a pair of wishbone arms, constructed to support between them a pan which may form the support for the lower end of the load spring associated with the suspension; to provide such a construction in which the arms are so constructed as to accommodate a substantially circularly formed pan; to provide such a construction in which the pan is secured to the arms by members which extend radially from diametrically opposite sides of the pan and pass through offsets in the arms, said offsets being disposed in tangential relation to the pan at the points of connection.

With the above and other objects in view, which appear in the following description and in the appended claims, preferred but illustrative embodiments of the present invention are shown in the drawings throughout which corresponding reference characters are used to designate corresponding parts, and in which:

Fig. 1 is a fragmentary view in front elevation, of a suspension embodying the present invention;

Fig. 2 is a view in top plan, taken along the line 2—2 of Fig. 1;

Fig. 3 is a developed view based upon Fig. 2.

Fig. 4 is a fragmentary view of a modified embodiment of certain of the elements of Fig. 2;

Fig. 5 is a view in elevation of the arm and pan assembly of Figs. 1 and 2, with certain of the parts broken away;

Fig. 6 is a top plan view of a modified arrangement of the lower wishbone arms of the suspension; and Fig. 7 is a view in side elevation of the elements shown in Fig. 4.

Considering Figs. 1, 2, 3, 4 and 5 in detail, it will be understood that the assembly there shown forms a connection between a vehicle frame 10 having a transverse frame member 11, and a front wheel 12 thereof, specifically the left hand front wheel, and that a corresponding but oppositely disposed assembly is provided to connect the frame 10 to the other front wheel. While an assembly embodying certain features of the illustrated assembly may be utilized in connection with the rear vehicle wheels, the improvements of the present invention may be sufficiently disclosed with reference to a front wheel suspension and, accordingly, the drawings and description are confined to a front wheel suspension.

In a broad sense, the illustrated arrangement embodies the construction described and claimed in the co-pending application of the present applicant, Serial No. 68,595, filed March 13, 1936, and comprises in general an upper wishbone arm 14 and a lower pair of wishbone arms 16 and 18, which in combination with the load spring 20, serve to connect the kingpin 22 to frame 10. Wheel 12 is rotatably supported upon a spindle 24 which forms part of a knuckle bracket 26 which may be suitably associated with kingpin 22 to permit bracket 26 to rotate about kingpin 22 in steering the vehicle, and yet positively fixes bracket 26 in a desired position axially of the kingpin 22.

The inner end of the upper wishbone arm 14 is pivotally connected to a bracket 30 secured in upstanding relation upon cross-frame member 10. The connection of arm 14 to bracket 30 is preferably of the threaded type, and may include the bushing 32 into which the turned end of arm 14 may be threaded and which in turn may be threaded into bracket 30, so as to permit rotation of arm 14 in the plane of the paper as viewed in Fig. 1 about bracket 30 as an axis. The outer end of arm 14 may be similarly pivotally connected to the upper end of kingpin 22.

The lower wishbone arms 16 and 18 are pivotally connected at their inner ends to the cross-frame member 10, through a shaft 34, which extends parallel to the axis of the vehicle frame 10, and are correspondingly pivotally connected at their outer ends to a stub shaft or trunnion 36. Trunnion 36 is provided with a centrally positioned transversely disposed boss 38, in which the lower end of kingpin 22 is secured. Shaft 34 is secured to frame member 11 by studs 37 which pass through bosses 35 formed in shaft 34. The bearings designated generally as 40 and 42 associated with arm 16, and 44 and 46 associated with arm 18 are described more in detail below, it being noted at the present time that these bearings permit the lower wishbone arms 16 and 18 to swing in a vertical plane relative to the vehicle frame 10 and to kingpin 22.

Spring pan 50, described in more detail hereinafter, is supported between the arms 16 and 18, by rivets 52 which pass through the upwardly directed flange 54 of pan 50 and through openings formed in offset bosses 56 and 58, in arms 16 and 18 respectively. A flanged lip 60 is formed at one side of pan 50, and forms a support for the usual rubber buffer 62 which cooperates with the buffer 64 secured to the cross-frame member 10, to resiliently limit downward movement of the frame relative to the wheel. Lip 60 is provided with a downwardly extending flange 66, through which it is secured to arms 16 and 18 by rivets 68 and 70, which pass through associated offset bosses 72 and 74, respectively, formed in the corresponding arms.

The usual load spring 20 is seated between the underside of the upper surface of the cross-frame 10 and the pan 50, and acts, as will be understood, to resiliently oppose downward movement of the vehicle frame relative to the wheel.

The operation of the assembly as a whole is described in detail in the above identified co-pending application and may be summarized by noting that a downward movement of the vehicle frame with respect to the wheels, resisted by the compressive force of the spring 20, or a correspondingly resisted upward movement of a wheel 12 with respect to the vehicle frame, results in pivoting the lower wishbone arms 16 and 18 in a counterclockwise direction about their bearings 40 and 44 and a corresponding swinging of the upper arm 14. These swinging movements are accompanied by corresponding pivotal movements between kingpin 22 and the arms, the relation between the lengths of the upper and lower arms being such as to maintain a desired relation of wheel 12 to the vertical during such swinging.

With reference to those features of the above generally described assembly to which the present invention is particularly directed, each of the bearings 40, 42, 44 and 46 is of the threaded type, bearing 46, between arm 18 and trunnion 36, preferably embodying in detail the construction disclosed and claimed in Patent No. 1,924,448 granted to the present applicant August 29, 1933. As shown, the associated end 80 of trunnion 36 is provided with righthand external threads of usual form. Righthand threads of pitch equal to that of the just mentioned external threads are formed within boss 84 at the end of arm 18. The bearing is completed by an intermediate bushing 86, having internal threads of mating capacity with the threads on trunnion 36, and external threads of mating capacity with the internal threads in boss 84. The internal threads in boss 84 and the corresponding external threads on bushing 86 are lightly cut and the parts form a slightly loose fit with each other. In assembling the bearing, boss 82 is fitted over the end of trunnion 36 to the proper position axially thereof and bushing 86 is then simultaneously threaded onto the end of trunnion 36 and into boss 84. When the head 88 of bushing 86 abuts the boss 84, any continued rotation of bushing 86 jams the external threads thereof into locking relation to the threads of boss 84, thus locking bushing 86 and trunnion 36 in position relative to arm 18.

The other bearing 44 associated with arm 18 may be of the construction just described with reference to bearing 46, but is illustrated as not utilizing the intermediate bushing. As illustrated, bearing 44 is formed by providing shaft 34 with external threads 90, of mating capacity with corresponding internal threads formed in boss 94 at the end of arm 18. The bearing is assembled by threading shaft 34 into boss 94, to a desired position with respect to arm 18.

In manufacturing and assembling units embodying threaded bearings, difficulty has heretofore been encountered in properly aligning the wishbone arms with respect to each other, and with respect to the associated bearing members, in order to prevent initial stresses from being imposed on the arms and particularly in order to prevent the bearings being placed under an initial load, which results in relatively rapid wear. The difficulties are due in part to manufacturing tolerances between the different threads, and in part to the difficulty in accurately matching the relative rotative positions of the thread entries. In accordance with the present invention these difficulties are overcome in a simple and effective manner by forming certain of the threaded bearings in such a way that in assembling them, the assembly operation results in the formation of the threads in certain of the members, thus resulting in an accurately matched and properly aligned unit.

As illustrated, bearings 40 and 42 are duplicates of bearing 46, with the exception that the bosses 96 and 98 are initially formed with lefthand threads, such as 96a, instead of righthand threads. As an alternative, the ends of bosses 96 and 98 may be provided, by a broaching operation or otherwise, with axially extending serrations, designated 97 in Fig. 4. The associated bushings 100 and 102, however, are formed with external righthand threads, and as described with reference to bearing 46, are provided with righthand internal threads of mating capacity with the corresponding righthand threads 104 and 106 formed on shaft 34 and trunnion 36 respectively. As in the previous case also, the external and internal threads on bushings 100 and 102 are of the same pitch, the external threads being relatively lightly cut in order to effect the ultimate jamming action described with reference to bearing 46.

In assembling the lower wishbone, in accordance with the preferred practice of the present invention, the lower wishbone arm 18 is first riveted to the pan 50 and lip 60, and shaft 34 and trunnion 36 thereafter secured within bosses 94 and 84 in the previously identified manner, it being commercially practicable to so match the threads 90 of shaft 34 with the corresponding threads of boss 94 and to so match the threads of trunnion 36, bushing 86 and boss 84, that when the just mentioned elements are assembled, arm 18 is positioned relative to shaft 34 and 36 within desired limits of accuracy.

Thereafter, arm 16 may be freely fitted over the ends of shaft 34 and trunnion 36, and riveted to pan 50 and lip 60 as previously described. Arms 18 and 16 are accurately located, in the course of riveting, relative to pan 50 and lip 60, so that at the conclusion of the last mentioned riveting operation, arms 18 and 16 are accurately positioned in the desired relation to each other, and are supported in this position by pan 50 and lip 60. The final assembly operation consists in threading the two bushings 100 and 102 over shaft 34 and trunnion 36, respectively, and into bosses 96 and 98, respectively. As bushings 100 and 102 are rotated, they are positively advanced along shaft 34 and trunnion 36 in accordance with the lead of the external threads on the latter and the mating internal threads on the former. During the course of this rotation and advance, the external threads on bushings 100 and 102 displace the metal of and form corresponding internal threads, such as 96b (Fig. 3) within the bosses 96 and 98. Since the latter threads are formed during the course of the insertion of bushings 100 and 102, it will be evident that such formed threads match perfectly with the external threads on the bushings, and accordingly, also match perfectly with the threads on shaft 34 and trunnion 36. In effecting the threading operation accordingly, no movement of boss 96 occurs axially of shaft 34, and no movement of boss 98 occurs axially of trunnion 36, so that arms 16 and 18 are maintained in proper relation to each other and to shaft 34 and trunnion 36. The threading action is completed as in the case of bearing 46, when the shoulders of the bushings 100 and 102 engage the outer faces of the bosses 96 and 98, at which time the external bushing threads jam with the internal boss threads cut thereby, locking the bushings in fixed rotative position relative to each other.

In the course of the above described assembly, the pre-cut, oppositely directed threads in the bushings 96 and 98, or alternatively, the pre-cut axial serrations 97 therein, serve two important functions. First, the metal of bushings 96 and 98, previously cut away in forming the oppositely directed threads or the serrations, substantially reduces the amount of metal which must be displaced by the bushings 100 and 102, thus facilitating the thread formation. Second, the pre-cut threads or serrations constitute a series of wells into which cutting lubricant may be directed, to facilitate the forming action. Moreover, the wells thus provided serve to receive the metal displaced by the forming operation.

A further feature of importance in the above construction, resides in the formation of the arms 16 and 18 and of the pan 50. It will be noted that pan 50 is of generally circular construction, which configuration materially facilitates the stamping of the pan from sheet metal. It will also be noted that although the arms 16 and 18 converge from the left to the right hand end thereof, as viewed in Figure 2, the rivets which secure these arms to pan 50, are located in diametrically opposed positions relative to pan 50, and extend radially thereof and at right angles to the faces of the bosses 56 and 58 in arms 16 and 18, respectively. This disposition of the rivets is of importance in that the pan is thus supported at its centerline, and consequently at the center of the load imposed thereon by the load spring 20. This mode of supporting pan 50, and the circular configuration of pan 50, is made possible in the illustrated arrangement by providing the bosses 56 and 58 in offset relation to the corresponding arms. The correspondingly offset bosses 72 and 74, associated with the upper lip 60, permit the rivets associated therewith to pass through the arms in a direction normal to the boss faces, and also to pass through the flanges of lip 60 in a direction normal to such flanges, thus providing a correspondingly desirable support for lip 60.

The remaining two figures Nos. 6 and 7 show a modified practice of the present invention, as well as an improved spring pan and bumper support arrangement, which latter features are described and claimed in the copending application of the present applicant, Serial No. 69,784, filed March 20, 1936. Referring particularly to Figures 6 and 7, the lower wishbone arms 16' and 18' correspond in general to arms 16 and 18 previously described and are pivotally connected to shaft 34' and to trunnion 36' through pivotal bearings of the threaded type designated generally as 40', 42', 44' and 46', each of which may, and preferably does, correspond in all respects to the previously described threaded pivotal bearings 40, 42, 44 and 46.

In the construction now being described, the pan 110 is of generally rectangular shape, having a base portion 112 adapted to support the lower end of the load spring in the manner described above, and two upstanding oppositely directed bosses 114 and 116, provided with externally threaded trunnions 118 and 120 respectively. The arms 16' and 18' are provided with bosses 122 and 124 offset relative to the corresponding arms, and which cooperate with trunnions 118 and 120 respectively, to form a pivotal support for pan 110. The bumper 126 is supported upon a bracket 128, one end 130 of which is freely seated upon the upper surface of arm 18', and the other end of which is provided with a downwardly directed flange 132, by which it is connected, through rivets 134, to the arm 16'.

Bearing 125 corresponds in all respects to bearing 44', and bearing 123 preferably corresponds in all respects to the bearings 40' and 42'. Bearings 123 and 125 provide a pivotal connection between the pan 110 and arms 16' and 18'.

In assembling the just described lower wishbone, in accordance with the preferred practice of the present invention, shaft 34' and trunnion 36' are first assembled to arm 18' as described with reference to the first embodiment, this assembly operation resulting in bringing arm 18' into sufficiently accurate position axially of shaft 34' and trunnion 36'. Pan 110 is correspondingly assembled to arm 18, by threading the trunnion 120 thereof into boss 124 to complete the freely rotatable threaded bearing 125, and bringing pan 110 into the desired position relative to arm 18'. The assembly operation may be completed by moving arm 16' over the end of shaft 34', trunnion 36' and trunnion 118 associated with pan 110, this movement continuing until arm 16' is in a desired position axially of the last mentioned elements. Thereafter, the bushings 100', 102' and 136, associated with bearings 40', 42' and 123 respectively, are threaded over the end of the associated members, and in the course of this threading operation, cut threads in the corresponding bosses of arm 16'. It will be understood that in effecting this final assembly operation, arm 16' may be suitably externally supported, so that the insertion of bushings may be effected either one at a time or otherwise, the resulting completed assembly producing matched threads as in the case of the first described embodiment and producing a lower wishbone assembly in which the respective arms are properly aligned with the associated bearing members.

Where bearings 40' and 42' duplicate bearing 46, the operations described in the immediately preceding paragraph are modified. In such instance arm 16' is assembled with bearings 40' and 42' prior to assembly of bearing 123. Some slight mismatching may occur between bearings 40' and 42', but due to the length of arm 16', and the consequent relatively large spacing between bearings 40' and 42' such mismatching may be expected to be minor enough to be disregarded. The final assembly of bearing 123 matches the threads thereof with the position for arm 16' determined by the previous assembly of bearings 40' and 42'.

Although specific embodiments of the present invention have been described, it will be evident that various changes in the form, number and arrangement of parts and various alterations in the specific mode of practicing the improved method, may be made within the spirit and scope thereof.

What is claimed is:

1. The method of assembling an inner member having an external threading surface, an outer member having an internal threading surface, and an intermediate member disposed to be threaded into said outer member and onto said inner member, said intermediate member having external and internal threading surfaces for cooperation respectively with said surfaces of said inner and outer members, which includes initially threading all but one of said surfaces with threads of similar lead, and threading the remaining surface by the threads in the cooperating surface during the assembly operation.

2. The method of assembling an inner member having an external threading surface, an outer member having an internal threading surface, and an intermediate member having external and internal threading surfaces for cooperation respectively with said surfaces of said inner and outer members, which includes initially forming said surfaces of said intermediate and inner members with threads of similar lead, and threading said intermediate member onto said inner member and into said outer member simultaneously, the intermediate member forming threads in said boss during said threading.

3. The method of assembling a threaded bearing comprising an inner member having an external threading surface, an outer member having an internal threading surface, and an intermediate member having external and internal threading surfaces for cooperation respectively with said surfaces of said inner and outer members, which includes initially forming all but one of said surfaces with threads of similar lead, initially cutting away part of the stock of the remaining surface, and forming the threads in the remaining surface by the threads in the cooperating surface during the assembly operation.

4. The method of assembling a threaded bearing comprising an inner member having an external threading surface, an outer member having an internal threading surface, and an intermediate member having external and internal threading surfaces for cooperation respectively with said surfaces of said inner and outer members, which includes initially forming all but one of said surfaces with similar threads, initially forming threads in said remaining surface of non-mating capacity with said first mentioned threads, and forming the threads in the remaining surface by the threads in the cooperating surface during the assembly operation.

5. The method of assembling a threaded bearing comprising an inner member having an external threading surface, an outer member having an internal threading surface, and an intermediate member having external and internal threading surfaces for cooperation respectively with said surfaces of said inner and outer members, which includes initially forming all but one of said surfaces with similar threads, initially forming axially extending serrations in said remaining surface, and forming the threads in the remaining surface by the threads in the cooperating surface during the assembly operation.

6. In combination, an outer member having an external threading surface, an inner member having an internal threading surface, and an intermediate member threaded onto said inner member and threaded into said outer member, said intermediate member having internal and external threading surfaces for cooperation respectively with said first mentioned external and internal threading surfaces, all but one of said threading surfaces being initially threaded with threads of similar lead and the remaining said threading surface having a thread threaded thereon by the threads of the cooperating surface during the assembly operation.

7. A threaded bearing assembly comprising an outer member, an inner member, and an intermediate member, and a bushing threaded over said inner member and into said outer member, certain of said members being provided with initially formed mating threads and one of said members having threads cut therein during assembly of said members together, said one of said members being initially provided with axially extending serrations.

8. A threaded bearing assembly comprising an outer member, an inner member, and an intermediate member threaded over said inner member and into said outer member, certain of said members being provided with initially formed mating threads and one of said members having threads cut therein during assembly of said members together, said one of said members being initially provided with threads of non-mating capacity with the threads of the adjacent member.

9. A threaded bearing assembly comprising an outer member, an inner member, and an intermediate member threaded over said inner member and into said outer member, certain of said members being provided with initially formed mating threads and one of said members having threads cut therein during assembly of said members together, said one of said members having part of the stock in which the threads are cut previously cut away to reduce the amount of stock removed by the thread cutting.

10. A threaded bearing assembly comprising an outer member having an internal threading surface, an externally threaded inner member, and an externally and internally threaded intermediate member threaded onto said inner member and threaded into said outer member, the cooperating threads of said inner and intermediate members being of mating capacity with each other, said threading surface having a thread threaded thereon by the cooperating external thread of the intermediate member.

11. The method of forming a wishbone assembly having a pair of spaced arms pivotally connected together adjacent one end to a cross member, and pivotally connected together at a point spaced from said cross member by a second cross member, which includes threadedly connecting one of said arms to said cross members to form pivotal threaded connections between said one arm and said cross members, providing openings in said other arm to receive said cross members, threading an externally and internally threaded bushing into each opening and onto the associated cross member and causing the external threads of one of said bushings to cut its own threads in the associated opening during said threading.

12. The method of forming threads in a body having a threading surface, utilizing a threaded member, which includes forming pockets in said threading surface; and threading said body and member together to cause said member to cut its own threads in said body, the metal displaced by said threading being accommodated in said pockets.

13. The method of forming threads in a body having a threading surface, utilizing a threaded member, which includes forming grooves in said surface extending angularly to the desired threads; and threading said body and member together to cause said member to cut its own threads in said body, the metal displaced by said threading being accommodated in said grooves.

14. The method of forming threads in a body having a threading surface, utilizing a threaded member, which includes forming axially extending grooves in said surface; and threading said body and member together to cause said member to cut its own threads in said body, the metal displaced by said threading being accommodated in said grooves.

15. The method of forming threads in a body having a threading surface, utilizing a threaded member, which includes forming pockets in said threading surface; threading said body and member together to cause said member to cut its own threads in said body, the metal displaced by said threading being accommodated in said pockets; and providing an additional member to apply an axial force between said member and body.

16. The method of connecting first and second members together through two threaded bearings each including an external thread fixed in position on one of the members and an internal thread fixed in position on the other member, and at least one of the bearings including a tubular member having internal and external threads interposed between the first mentioned external and internal threads, which includes forming said threads in such relation that when the external and internal threads of one bearing are in freely mating relation to each other, the internal and external threads of the other bearing are in correspondingly freely mating relation to each other.

17. The method of manufacturing two parts of a structure wherein one part includes two like threaded pin portions substantially fixed relatively and the other part includes two openings substantially fixed relatively and into which the pin portions are adapted to project and one of which openings is larger than the pin portion therefor, which comprises threading one pin portion into one opening to provide a threaded, pivotal bearing, disposing the other pin portion in the other opening, providing an internally and externally threaded tubular member wherein the internal and external threads have the same pitch and lead as the threads on such other pin portion, and threading the member on to such other pin portion so as to simultaneously cause the external threads on the member to form threads in said other opening.

18. The method of manufacturing two parts of a structure wherein one part includes two like threaded pin portions substantially fixed relatively and the other part includes two openings substantially fixed relatively and into which the pin portions are adapted to project, and one of which openings is larger than the pin portion therefor, which comprises threading one pin portion into one opening to provide a threaded, pivotal bearing, disposing the other pin portion in the other opening, providing serrations in the surface defining the other opening, and then threading said member on to such other pin so as to simultaneously cause the external threads on the member to form threads in the serrated surface in said opening.

19. The method of manufacturing two parts of a structure wherein one part includes two pin portions substantially fixed relatively and the other part includes two openings substantially fixed relatively and into which the pin portions are adapted to project and one of which openings is larger than the pin portion therefor, which comprises providing threads on the other pin portion and in the opening therefor and pivotally threading the pin portion into the opening, disposing the other pin portion in the opening therefor, providing a tubular member having internal and external threads of the same lead and pitch and which threads respectively are adapted to engage the peripheries of the pin and opening, providing threads on one of such peripheries, and threading such tubular member into the opening by engagement of the threads on said one of the peripheries so as to simultaneously form threads on the other of such peripheries by means of the threads on the tubular member.

20. The method of manufacturing a threaded bearing assembly which comprises utilizing first, second and third members having surfaces disposed to be provided with respective internal and external threads so that one of the members can be threaded onto one of the other members and threaded into the other member; initially forming threads of like lead and pitch on all but one of the said surfaces; and simultaneously threading said members together so as to form the threads on the remaining surface by the threads on the cooperating surface.

21. The method of manufacturing a threaded bearing assembly which comprises utilizing an inner member disposed to have external threads formed thereon and an outer member disposed to have internal threads thereon, initially forming certain of said internal and external threads, and simultaneously threading a tubular member having external and internal threads thereon onto said inner member and into said outer member, said tubular member acting to form the remaining said first mentioned internal and external threads during said threading.

JOHN W. LEIGHTON.